(12) United States Patent
Picon

(10) Patent No.: US 9,652,619 B2
(45) Date of Patent: May 16, 2017

(54) METHOD OF INPUTTING CONFIDENTIAL DATA ON A TERMINAL

(71) Applicant: MORPHO, Issy-les-Moulineaux (FR)

(72) Inventor: Romain Picon, Issy les Moulineaux (FR)

(73) Assignee: MORPHO, Issy-les-Moulineaux (FR)

( * ) Notice: Subject to any disclaimer, the term of this patent is extended or adjusted under 35 U.S.C. 154(b) by 116 days.

(21) Appl. No.: 14/595,051

(22) Filed: Jan. 12, 2015

(65) Prior Publication Data

US 2015/0199527 A1 Jul. 16, 2015

(30) Foreign Application Priority Data

Jan. 13, 2014 (FR) ..................................... 14 50235

(51) Int. Cl.
| | | |
|---|---|---|
| *G06F 7/04* | (2006.01) | |
| *G06F 17/30* | (2006.01) | |
| *H04N 7/16* | (2011.01) | |
| *G06F 21/60* | (2013.01) | |
| *G06F 21/31* | (2013.01) | |
| *G06F 21/44* | (2013.01) | |

(52) U.S. Cl.
CPC .............. *G06F 21/60* (2013.01); *G06F 21/31* (2013.01); *G06F 21/44* (2013.01); *G06F 2221/031* (2013.01)

(58) Field of Classification Search
CPC ...... G06F 21/60; G06F 21/10; G06F 21/6245; G06F 21/606; G06F 21/6254
USPC .......................................................... 726/26
See application file for complete search history.

(56) References Cited

U.S. PATENT DOCUMENTS

| | | |
|---|---|---|
| 5,664,099 A | 9/1997 | Ozzie et al. |
| 6,950,949 B1 | 9/2005 | Gilchrist |
| 2006/0195907 A1* | 8/2006 | Delfs ...................... G06F 21/74 726/26 |
| 2008/0250217 A1* | 10/2008 | Kershaw ............. G06F 12/1483 711/163 |

OTHER PUBLICATIONS

Albritton, B., et al., *IIIF International Image Interoperability Framework: Image API 1.1*, https://web.archive.org/web/2013111 1165717/http://www-sul.stanford.edu/iiif/image-api/1.1/, Sep. 17, 2013, XP055128093, pp. 1-10.

* cited by examiner

*Primary Examiner* — Kambiz Zand
*Assistant Examiner* — Stephen Sanders
(74) *Attorney, Agent, or Firm* — Blakely Sokoloff Taylor & Zafman LLP

(57) ABSTRACT

The invention relates to a method of inputting confidential data on a terminal including an input interface, at least one processor for running a trusted program and a display screen, the method including the following steps applied before the input:
  taking exclusive control of the input interface by the trusted program;
  displaying on the screen a trusted image known to the user of the terminal to indicate that exclusive control of the input interface has been taken by the trusted program;
  after control has been taken and before displaying the trusted image, selecting the trusted image as part of a reference image predetermined by the user, wherein the selected trusted image varies from one input to another.
The invention also relates to a terminal for use of said method.

13 Claims, 5 Drawing Sheets

METHOD OF INPUTTING CONFIDENTIAL DATA ON A TERMINAL

GENERAL FIELD

The invention relates to the field of input and display of confidential information on a personal terminal.

The invention relates more particularly to a method for securing such input of confidential information.

STATE OF THE ART

Methods by which a user can securely input his personal confidential information (particularly authentication information) on a terminal provided with an input interface and a display screen have been known for a long time.

For example, it is well known that the input of a code with several numbers such as a PIN code can be protected by displaying masking symbols (for example a star) on the screen instead of the number, to prevent interception of the input code by a malicious third party looking at the screen of the terminal.

In order to satisfy the increasing number of confidential data transactions on line from a user terminal, secure "trusted execution environment" (TEE) programs have been proposed in which the terminal is configured in a "secure" state before the user inputs confidential data on his terminal (Trusted User Interface).

A trusted execution environment is usually a secure program that is independent of an operating system dedicated to routine use and that accesses input interface of the terminal and its screen. In the secure state, the secure program selectively processes data input by the user through the terminal input interface.

Such an interface guarantees to the user that he is displaying and validating authentic information (amount of a transaction, players in the transaction), and that he is inputting his personal or confidential data (for an example a PIN code) in a trusted execution environment.

It is therefore important to notify the user that the trusted user interface has actually configured the terminal in the secure state before he inputs his confidential data.

In order to inform the user of such an event, document U.S. Pat. No. 7,302,585 disclosed how the trusted user interface can define a trusted image known to the user to indicate the secure state of the terminal. Before the user inputs confidential information, a single copy of the trusted image is displayed on the screen or several copies are displayed in a mosaic, to notify to the user that this secure state is actually active.

However, this solution does not provide absolute protection for the user against phishing attacks. A malicious third party present in the user's environment or who has judiciously placed cameras in this environment could intercept the trusted image displayed on the screen and understand that it means that the user is ready to input confidential information. This third party could then reproduce the trusted image in a malicious program that would imitate the behaviour of the trusted program by displaying the trusted image on the terminal in order to mislead the user and thus retrieve his confidential information.

PRESENTATION OF THE INVENTION

Therefore, the invention is aimed at further improving the confidential input of confidential data on a terminal using a trusted user interface without increasing the manufacturing cost of the terminal.

Therefore, a method is disclosed of inputting confidential data on a terminal including an input interface, at least one processor for running a trusted program and a display screen, the method including the following steps applied before the input:
   taking exclusive control of the input interface by the trusted program;
   displaying on the screen a trusted image known to the user of the terminal to indicate that exclusive control of the input interface has been taken by the trusted program;
   after control has been taken and before displaying the trusted image, selecting the trusted image as part of a reference image predetermined by the user, wherein the selected trusted image varies from one input to another.

Since only part of the predetermined trusted image is displayed on the screen during the input procedure, and this part is different for each new input of confidential data, a malicious third party would be incapable of reproducing the entire trusted image in a phishing program intended to mislead the terminal user.

Obviously, the reference image may represent any type of information: a drawing, a character, a sequence of characters such as all or part of a phrase or a text, etc.

The trusted image may be selected from selection data chosen by the user and acquired by the input interface after taking control. As a variant, the trusted image is randomly selected.

The trusted program may receive the trusted image from a remote server. Reception of the trusted image can also be controlled by sending a request to the remote server, the request being generated by the trusted program from acquired selection data, and the trusted image being selected by the remote server.

The disclosed method may also include the display of a partition pattern with N regions on the screen before the trusted image is displayed, each region being associated with a corresponding part of the reference image, the selection data acquired by the input interface being representative of a number less than N of regions in the partitioning pattern selected by the user.

The input interface may include a touch sensitive element, the selection data then being representative of at least one zone touched by the user.

If the touch sensitive element is included in the display screen, the touched zone may be representative of a set of contiguous points touched on the screen between when the external body comes into contact with the tablet until subsequent contact between said external body and the screen is broken.

The steps in the method may be repeated several times, with a first input and a second input following the first input, the method also including steps to store a first trusted image displayed for the first input, and to compare a second trusted image to be displayed for the second input with the first stored trusted image, wherein the second trusted image is displayed on the screen only if it is different from the first image.

A second aspect of the invention relates to a trusted computer program product comprising program code instructions for execution of the subsequent steps when it is executed by a terminal including input interface and a display screen, before confidential data are input; take exclusive control of the input interface, control the display of a trusted image on the screen indicating that control has been taken, the computer program being characterised in that it is also configured to control selection of the trusted image as part of a reference image predetermined by the user, the selection being variable from one input to another.

According to a third aspect, it also discloses a terminal comprising input interface, a display screen, and at least one processor for executing the trusted program according to the second aspect.

DESCRIPTION OF THE FIGURES

Other characteristics, purposes and advantages of the invention will become clear from the following description, which is purely illustrative and is non-limitative, and that must be read with reference to the appended drawings in which.

Similar elements in all figures have identical references.

DETAILED DESCRIPTION OF THE INVENTION

Figure 1:
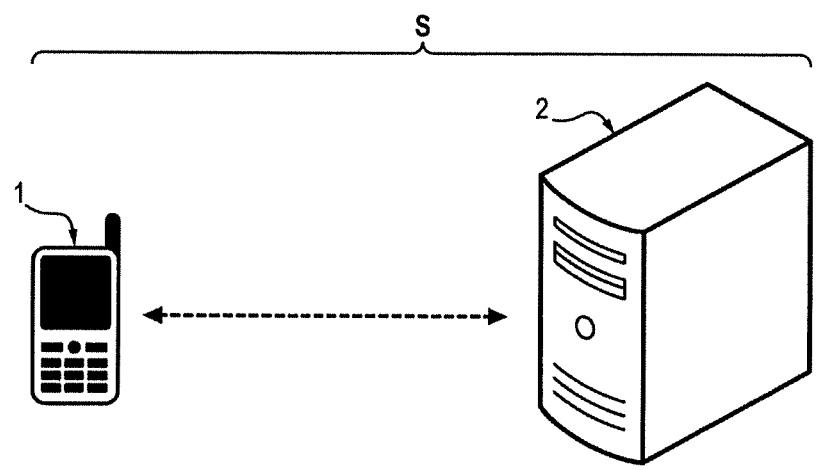
FIGS. 1 and 2 diagrammatically show a system according to one embodiment of the invention.
Figure 2:
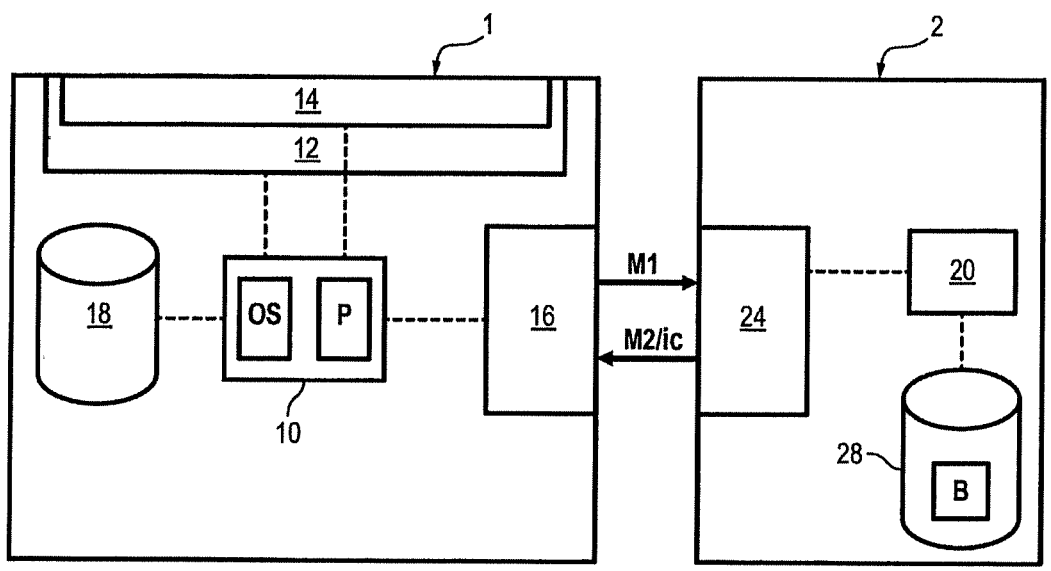

FIGS. 1 and 2 show a system S comprising at least one terminal 1 and a remote server 2.

The terminal 1 comprises a communication interface 16, at least one processor 10, a memory 18, a display screen 12 and input interface 14.

The input interface 14 may comprise a keyboard and/or a touch sensitive element (more generally any man/machine interface). The touch sensitive element may be included in the display screen 12 so as to form a touch sensitive screen with it.

The processor(s) 10 is designed to run an operating system OS, and a trusted program P independent of the operating system OS.

The trusted program P includes program code instructions to run different tasks.

The trusted program P is firstly configured to open access to input interface 14 exclusively in read, in other words that any data acquired by the input interface after this opening of an access can only be processed by the trusted program, excluding the operating system or any other program installed in the terminal 1. Such opening of an access is qualified as "taking exclusive control" in the remainder of this text.

The trusted program P is also configured to control the display of images on the screen 12 and to communicate with the remote server 12 through the communication interface 16.

The trusted program P is also configured to process confidential data acquired by the input interface 12. This processing may for example consist of authentication of the user with the terminal itself or with a remote site accessed by the terminal through the communication interface 16; this processing may also form part of a bank transaction.

The communication interface 16 may be wireless and comprise an antenna (Wifi, cell phone, etc.)

Alternatively, the communication interface 16 is wire (Ethernet).

The memory 18 may be of at least one hard disk drive, at least one flash memory, at least one EEPROM, at least one removable USB key, or a combination of these types.

Furthermore, the server 2 comprises a communication interface 24 adapted to communicate with the communication interface 16 of the terminal 1.

The server 2 also includes at least one processor and a memory 28 storing a database B that will contain one or several trusted images, each trusted image being associated with a specific user.

Figure 3:
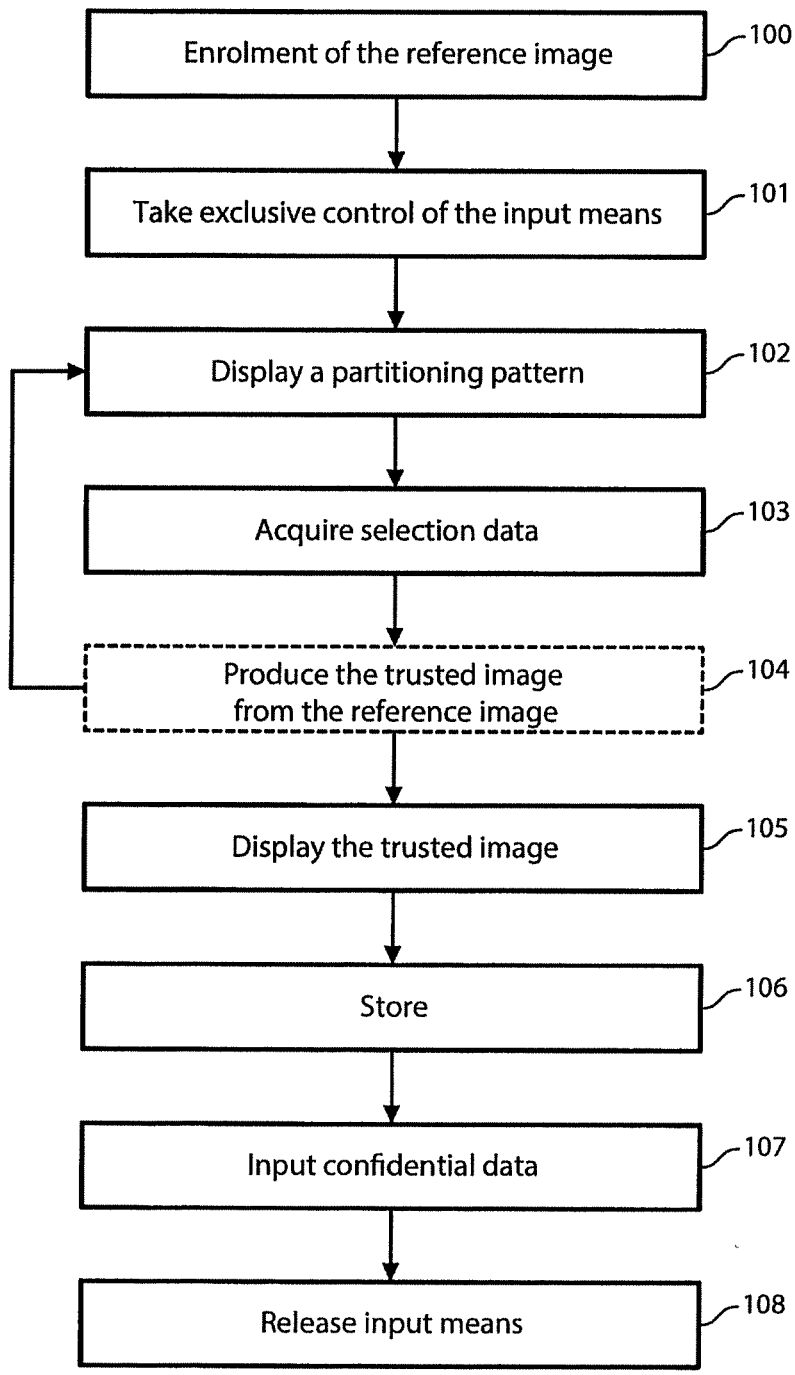
FIG. 3 is a flow chart showing steps in a method for inputting confidential data according to one embodiment of the invention.

We will now describe details of steps in the method shown in FIG. 3.

In a preliminary enrolment step 100, a user determines a reference image IR known to himself alone, possibly but not necessarily through the terminal 1. The enrolment step 100 may for example include the trusted program P sending the reference image previously chosen by the user to the remote server 2 and the remote server 2 stores this reference image in its database B. Since the trusted image is not stored by the terminal 1, it cannot be recovered during a theft of the terminal 1 by a malicious third party. As a variant, this reference image is stored in a memory zone 18 of the terminal, this zone preferably being accessible only by the program P to prevent this reference image being read by a malicious program installed on the terminal 1 and typically run by the operating system OS.

In a step reference 101, the trusted program P takes exclusive control of the input interface 14. After taking exclusive control, any data acquired by the input interface 14 will be processed exclusively by the trusted program P (and not by the operating system OS).

In a step 104, a trusted image IC is produced from the reference image IR after taking control. The trusted image IC is a part of the reference image IR selected in it; in other words, the reference image IR is represented by a set of pixels, therefore the trusted image IC is represented by a sub-set of this set of pixels. In the embodiment disclosed below, the server 2 produces 104 the trusted image IC, but as a variant, it may be produced by the trusted program P itself.

The trusted image IC may be selected in the reference image as a function of selection data acquired by input interface during a prior step 103 implemented after taking control 101; the user then participates in determination of this trusted image in the reference image. As a variant, the trusted image IC is selected at random in the reference image IR.

The trusted image IC is then displayed on the screen 12 in a step reference 105. The user of the terminal 1 can then verify if the trusted image IC displayed on the screen 12 actually corresponds to part of the reference image IR that he has previously chosen during the enrolment step 100. The user can then be sure that the trusted program has obtained exclusive access to the input interface 14.

The user can then enter confidential data on the terminal 1 using input interface 12, and the confidential data will then be processed exclusively by the trusted program P in a step reference 107.

In a step 106, the trusted image IC is stored (for example in the memory 18 on the terminal 1 or on the remote server 2). This storage step may be implemented before the trusted image is displayed or later.

After the confidential data have been input 107 and processed, the trusted program releases 108 access to input interface 14. The input interface 14 can be used by the operating system OS after the release 108.

Steps 101 to 108 may be repeated for each input of confidential data that the trusted program P might need to process.

The enrolment step 100 may also be repeated between several sequences of steps 101 to 108 so as to change the reference image IR.

Figure 4:
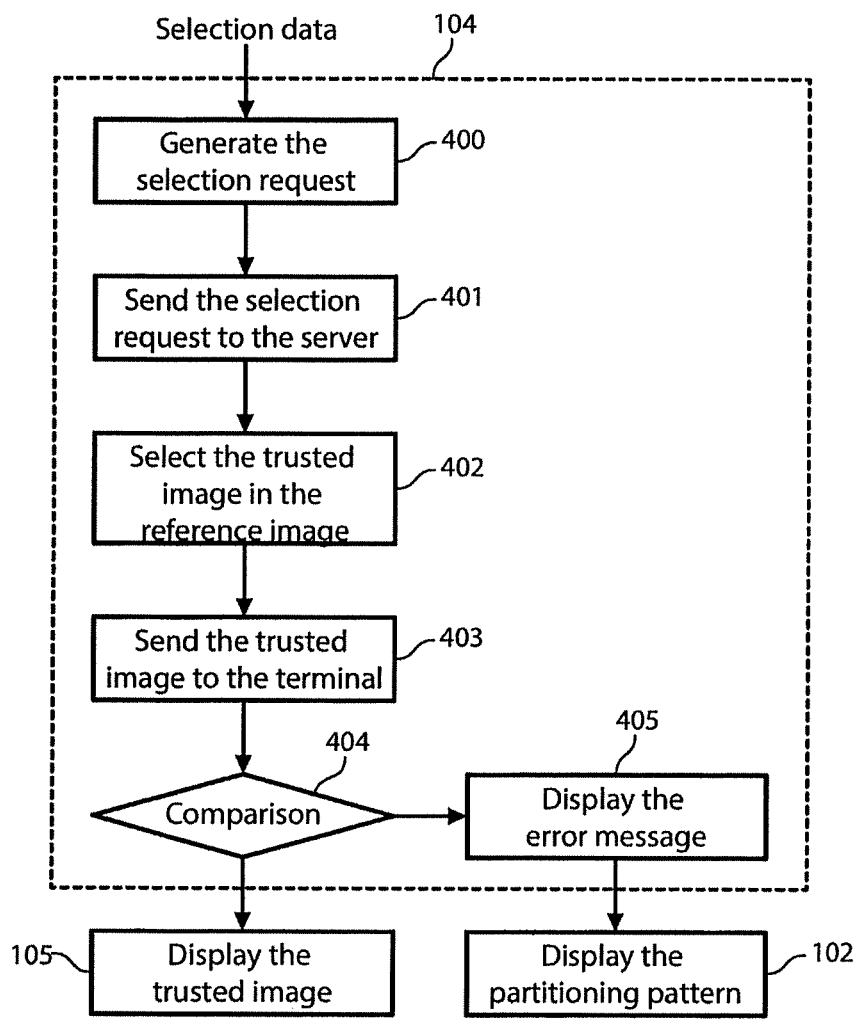
FIG. 4 gives details of sub-steps of one step in the flow chart in FIG. 3, according to one embodiment of the invention.

With reference to FIG. 4, the step 104 in which the trusted image is produced may include the following sub-steps, in one embodiment in which the remote server 2 is used.

The trusted program P generates a selection request M1 in a sub-step 400, and orders that this request M1 should be sent 401 to the remote server 2 through the communication interface 16. The selection request M1 can typically include an identifier that will identify the sending trusted program P (such as a program number), the terminal (by a model or serial number), or the user himself if the terminal is multi-users.

The communication interface 24 of the server receives the query M1 and then send it to the processor(s) 20 of the remote server 2. In a step 402, the processor(s) 20 access the database B and search in it for a reference image IR associated with the identifier contained in the query M1. Once the reference image IR has been found, the processor(s) 20 select the trusted image IC as part of the reference image IR.

The processor(s) 20 then generate a response M2 including the selected trusted image IC, which is sent 403 to the terminal 1 that made the request M1.

After the response M2 has been received, the terminal 1 makes a comparison 404 of the received trusted image with a trusted image stored during a previous input of confidential data (step 106).

If the compared images are identical, then an error message is displayed 405 on the screen 12 prompting the user to input new selection data (in a new application of step 103). This prevents the user from selecting a same trusted image in the reference image for several successive inputs. A user who has become used to always selecting the same trusted image in the reference image may be victim of phishing attacks applied by a malicious program that would not do anything other than display this same trusted image; therefore this prohibition prevents such a situation.

If the compared images are different, the trusted image IC is displayed 105 on the screen 12.

The trusted image preferably does not cover too much of the reference image, preferably less than 50% of its area, which makes attempts to recover the reference image more difficult.

The method may also include a limitation of the area of the reference image in which the trusted image can be selected (which effectively prevents selection of part of the reference image); thus, the reference image can never be reconstructed by the reference image.

The method may also include the display of a message on the screen prompting the user to change the reference image after a determined time or a determined number of inputs. It may be considered that after this time, the reference image has been completely exposed and a new reference image should be enrolled.

Grid Production Method

Figure 5:
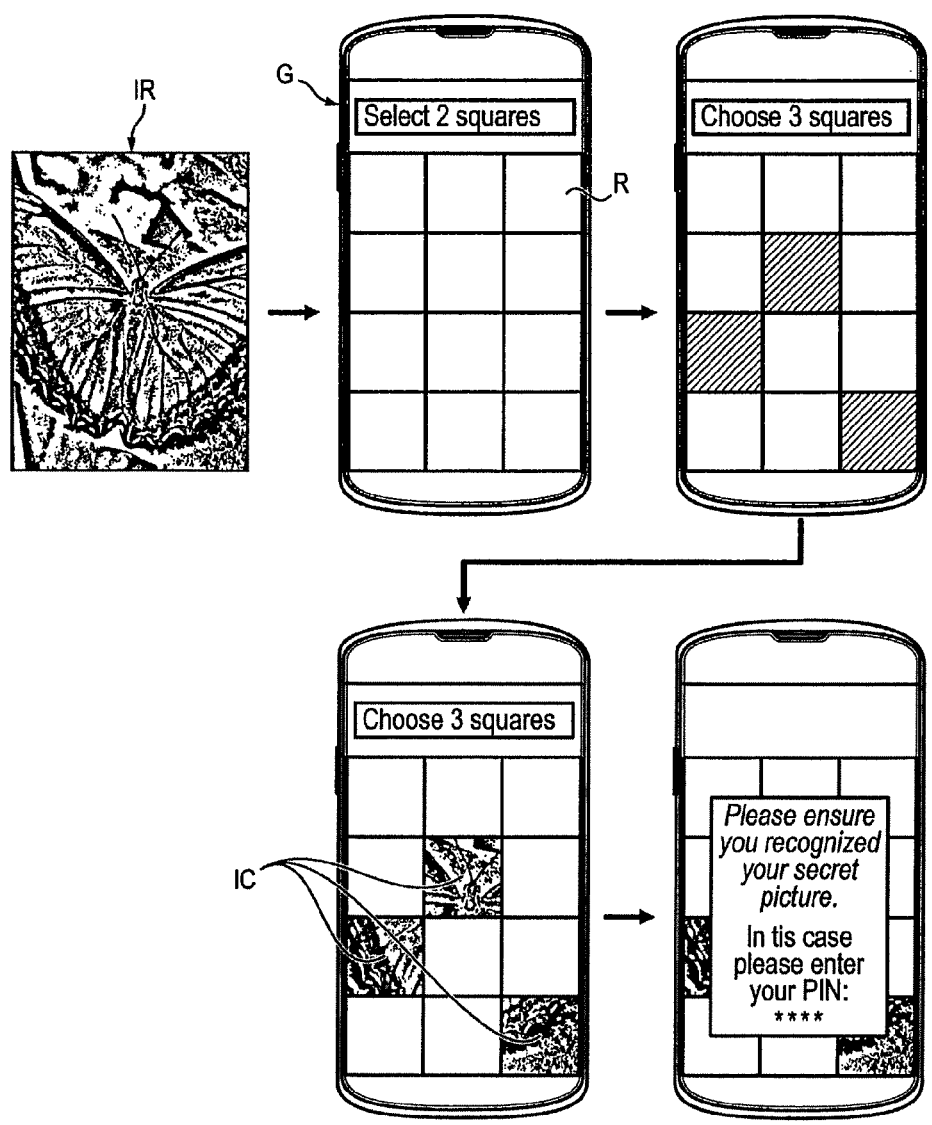
FIG. 5 shows the different states of the screen of a terminal during implementation of an input method according to a first embodiment.

FIG. 5 shows the different states of the screen of the terminal 1 during execution of the input method, according to a first so-called "grid" embodiment.

In this grid embodiment, the input interface 14 consists of a touch sensitive element included in the display screen 12. Furthermore, the trusted program P controls the display 102 of a predetermined partitioning pattern G, in a step 102 done before acquisition 103 of the selection data. The partitioning pattern G comprises several regions R, each region delimiting a corresponding region of the reference image.

A message prompting the user to select a number N of regions R less than the total number of regions in the partitioning pattern G may also be displayed during step 102.

Every time that the user touches one of the regions R on the screen 12, the touch sensitive element acquires 103 selection data representative of the touched region and sends these selection data to the trusted program; the region corresponding to these selection data is then selected in the reference image (step 104).

The step 103 repeated N times then produces N selection data representative of N regions touched by the user.

The trusted image IC produced after step 104 is then the union of N regions (adjacent or not) in the reference image IR corresponding to the regions R in the partitioning pattern touched by the user on the touch screen.

In this grid embodiment, it should be noted that the selection data may be a simple region index R in the grid G. The request M1 sent to the server 2 may thus include N region indices in the displayed grid using a small number of bits, which reduces the size of the request M1 transferred between the terminal 1 and the server 2, compared with requests containing more complex selection data such as a set of pixel coordinates.

In the example shown in FIG. 5, the partitioning pattern G is a grid of 3×4 square boxes with the same dimensions and coloured with the same predetermined colour, the grid having dimensions that can be superposed on the reference image; a message is displayed at the top of the screen prompting the user to touch 3 of the 12 boxes making up the grid.

Every time that the user touches one of the boxes, the trusted program can then colour each touched box in a colour different from the colour of the untouched boxes in the partitioning pattern displayed on the screen (image at the top right in FIG. 5) so that the user can see the number of boxes that he has already selected and the number of boxes that he can still select.

Three regions of the grid have been touched by the user on the image at the top right.

If a user touches a box that he has previously touched, the trusted program can also "deselect" the touched box.

The step 107 to input confidential data may be preceded by the display of a semi-transparent window displayed "above" the grid G as shown in the image at the bottom right of FIG. 5, the window prompting the user to verify if the trusted image IC displayed is actually part of the reference image, and if so, to input his confidential data (a PIN code in the example shown).

Free Plot Embodiment

Figure 6:
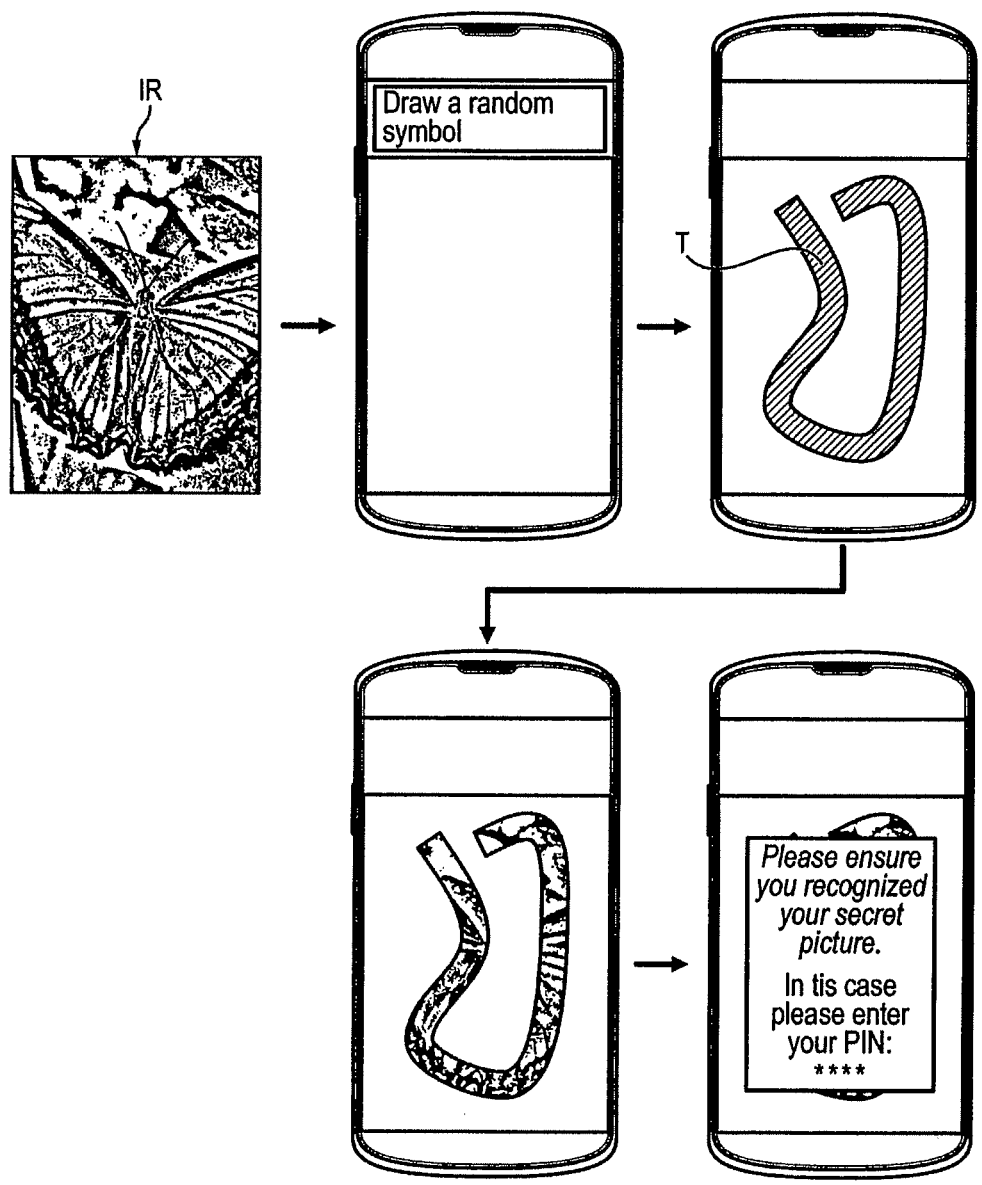
FIG. 6 shows different states of the screen of a terminal during implementation of an input method according to a second embodiment.

FIG. 6 shows the different states of the terminal screen during execution of the input method according to a second "free plot" embodiment.

As in the grid variant, the selection data correspond to a zone of the touch screen touched by the user. However, in the free plot variant, this zone is not a set of regions with a predetermined size, but rather a freely chosen zone T drawn by the user.

More precisely, the zone touched on the touch screen by the user is composed of a set of contiguous points on the screen touched between when an external body is brought into contact with the touch screen and when contact between the external body and the touch screen is broken (the external body typically being one or several fingers of the user, a stylus, etc.).

The method according to this free plot embodiment can thus include a step in which an image with a predefined colour that can be superposed on the reference image is displayed, and a message prompting the user to plot a zone chosen freely by the user.

The free plot embodiment enables very fast execution of the step 103 to acquire selection data by a simple plot of the user on the touch screen; moreover, the chances that the user will select the same pixels during two successive inputs are statistically very small, which contributes to increasing the complexity in reconstructing the reference image IR by a nearby third party.

The method according to the free plot embodiment may include display of the semi-transparent window disclosed for the grid embodiment.

Other Embodiments

Other embodiments not shown could also be envisaged.

Since the reference image IR is stored in the memory 18 in the terminal 1, the steps described above may be used locally by the trusted program P without the assistance of the remote server 2. During step 104, the trusted program P then accesses the reference image IR stored in the memory 18 of the terminal 1 to produce the trusted image to be displayed later.

The step 106 in which the trusted image is stored may also be performed in the memory 28 of the server 2, before step 403, instead of in the memory 18 of the terminal.

Other types of input interfaces 14 can also be used in the terminal, for example a keyboard. In the grid variant, directional keys of the keyboard can be used to navigate in the partitioning pattern and select regions R in it.

The method according to the invention is not limited to the context of inputting a PIN code but it can also be used to secure the input of other types of authentication codes (for example an access code to a web site or to a particular service provided by the trusted program or more generally other types of confidential data).

The invention claimed is:

1. Method of inputting confidential data on a terminal including an input interface, at least one processor for running a trusted program and a display screen, the method including the following steps applied before a first input of confidential information and before a second input of confidential information:
   taking exclusive control of the input interface by the trusted program;
   displaying on the screen a trusted image known to the user of the terminal to indicate that exclusive control of the input interface has been taken by the trusted program;
   after control has been taken and before displaying the trusted image, selecting the trusted image as part of a reference image predetermined by the user, wherein the selected trusted image varies from the first input to the second input.

2. Method according to claim 1, in which the trusted image is selected from selection data chosen by the user and acquired by the input interface after taking control.

3. Method according to one of claims 1 and 2, comprising receiving the trusted image by the trusted program from a remote server.

4. Method according to claim 1, in which the trusted image is selected from selection data chosen by the user and acquired by the input interface after taking control, wherein the method comprises receiving the trusted image by the trusted program from a remote server, and in which receiving the trusted image is controlled by sending a request to the remote server, wherein the request is generated by the trusted program from acquired selection data, and the trusted image is selected by the remote server.

5. Method according to claim 2, also comprising displaying a partition pattern with N regions on the screen before the trusted image is displayed, each region being associated with a corresponding part of the reference image, the selection data acquired by the input interface being representative of a number less than N of regions in the partitioning pattern selected by the user.

6. Method according to claim 2, in which the input interface includes a touch sensitive element, and wherein the selection data are representative of at least one zone touched by the user.

7. Method according to claim 6, in which the touch sensitive element is included in the display screen, and the touched zone is representative of a set of contiguous points touched on the screen between when an external body comes into contact with the display screen until contact between said external body and the display screen is broken.

8. Method according to claim 1, further comprising:
   storing a first trusted image displayed for the first input,
   comparing a second trusted image to be displayed for the second input with the first stored trusted image,
wherein the second trusted image is displayed only if it is different from the first image.

9. Trusted computer program comprising program code instructions for executing the subsequent steps when it is executed by a terminal including an input interface and a display screen, before confidential data are input:
   taking exclusive control of the input interface,
   controlling display of a trusted image on the screen indicating that control has been taken, and
   controlling selection of the trusted image as part of a reference image predetermined by the user, wherein the selected trusted image varies from one input to another.

10. Terminal comprising an input interface, a display screen, and at least one processor for executing a trusted program according to claim 9.

11. Terminal according to claim 10, in which the input interface includes a touch sensitive screen.

12. Terminal according to one of claims 10 and 11, also comprising a communication interface for communicating with a remote server, and in which the computer program is configured to:
   send a selection request to the remote server comprising selection data chosen by the user and acquired by the input interface after taking control in reply to the request, from the remote server.

13. System comprising a terminal according to claim 12 and a server comprising at least one processor, a communication interface for communicating with at least one terminal according to claim 12, wherein the processor is configured to
   select a trusted image as part of the predetermined reference image, starting from the selection request received by the communication interface, and
   send the selected trusted image to the terminal.

* * * * *